(12) United States Patent
Mohamed

(10) Patent No.: US 12,285,999 B2
(45) Date of Patent: Apr. 29, 2025

(54) WHEEL COVER

(71) Applicant: Guled Mohamed, Lakeland, TN (US)

(72) Inventor: Guled Mohamed, Lakeland, TN (US)

(73) Assignee: Wheel Booties LLC, Memphis, TN (US)

( * ) Notice: Subject to any disclaimer, the term of this patent is extended or adjusted under 35 U.S.C. 154(b) by 0 days.

(21) Appl. No.: 18/311,314

(22) Filed: May 3, 2023

(65) Prior Publication Data
US 2023/0356579 A1    Nov. 9, 2023

Related U.S. Application Data

(60) Provisional application No. 63/364,055, filed on May 3, 2022.

(51) Int. Cl.
*B60J 11/10* (2006.01)
*B62J 23/00* (2006.01)

(52) U.S. Cl.
CPC ............... *B60J 11/10* (2013.01); *B62J 23/00* (2013.01)

(58) Field of Classification Search
CPC ....... B60B 15/00; B60C 19/125; B60C 27/16; B60J 11/10; B62D 43/00; B62D 43/005; B62J 23/00; B65D 85/02; B65D 85/06
USPC ...................................... 206/304.1
See application file for complete search history.

(56) References Cited

U.S. PATENT DOCUMENTS

| | | | |
|---|---|---|---|
| 496,909 A * | 5/1893 | Shank | |
| 1,303,224 A * | 5/1919 | Achtmeyer | B62D 43/005 211/24 |
| 1,689,438 A | 10/1928 | Jellison | |
| 1,910,416 A | 5/1933 | Wollheim | |
| 1,947,144 A * | 2/1934 | Zerk | B65D 85/06 206/304.2 |
| 1,967,522 A | 7/1934 | Wengard | |
| 3,326,259 A * | 6/1967 | McCollegan | B60J 11/00 206/304.1 |
| 4,126,169 A | 11/1978 | Magnuson et al. | |
| 5,076,477 A | 12/1991 | Colgan | |
| 6,273,159 B1 | 8/2001 | Page | |
| 7,478,723 B2 | 1/2009 | Spater et al. | |

(Continued)

FOREIGN PATENT DOCUMENTS

| | | |
|---|---|---|
| BR | 7002652 | 7/1991 |
| CN | 2220957 | 5/1995 |

(Continued)

*Primary Examiner* — Bryon P Gehman
(74) *Attorney, Agent, or Firm* — Liam O'Donnell

(57) ABSTRACT

Various implementations include a tire cover. The tire cover includes a body, first and second straps, and first and second fasteners. The body has first and second body ends and first and second body sides. The body defines a first channel extending along the first body side and a second channel extending along the second body side. The first strap extends through the first channel and the second strap extends through the second channel. First strap ends of the first strap and the second strap are coupled to the first body end, and second strap ends of the first strap and the second strap are coupled to the second body end. The first fasteners are coupled adjacent the first body end. The second fasteners are coupled adjacent the second body end. Each of the second fasteners is releasably couplable to a different one of the first fasteners.

12 Claims, 17 Drawing Sheets

(56) References Cited

U.S. PATENT DOCUMENTS

| | | | |
|---|---|---|---|
| D618,608 S | 6/2010 | Fleck | |
| 8,021,279 B2 | 9/2011 | Behmer | |
| 2005/0183973 A1 | 8/2005 | Spater et al. | |
| 2009/0315357 A1 | 12/2009 | Spater et al. | |

FOREIGN PATENT DOCUMENTS

| | | |
|---|---|---|
| CN | 214984624 | 12/2021 |
| EP | 2533983 | 2/2015 |
| GB | 2485214 | 9/2012 |
| JP | 3166765 | 3/2011 |
| KR | 200320512 | 7/2003 |
| KR | 20100108183 | 10/2010 |
| KR | 101252426 | 4/2013 |
| KR | 200472942 | 5/2014 |
| RU | 175614 | 12/2017 |
| TW | 101219546 | 4/2013 |
| WO | 01/43958 | 6/2001 |

\* cited by examiner

WHEEL COVER

FIELD

This disclosure relates to the field of wheeled transportation devices and related accessories. More particularly, this disclosure relates to a cover for preventing tracking of dirt and other contaminants from tires of a bicycle or other wheeled transportation devices.

BACKGROUND

When bicycles are ridden outdoors, tires of the bicycle may accumulate dirt or other debris from an outside environment. Dirt and debris may become trapped within tread of the tire. When the bicycle is brought indoors or into a garage, dirt and debris from the tires may become dislodged and fall onto a floor surface underneath the bicycle.

Covering of a bicycle tire may be difficult. For example, covering a bicycle tire may require removal of a wheel of the bicycle to accommodate a cover for a tire of the bicycle. Removing the wheel may be difficult and may discourage use of a cover or other attempts to prevent dirt and debris from falling from the tire.

What is needed, therefore, is a bicycle tire cover that may be placed over a tire of a bicycle to prevent debris and dirt from the tire from falling on a floor surface underneath the bicycle.

SUMMARY

Various implementations include a tire cover. The tire cover includes a body, a first strap, a second strap, one or more first fasteners, and one or more second fasteners. The body has a longitudinal axis, a first body end, a second body end opposite and spaced apart along the longitudinal axis from the first body end, a first body side extending from the first body end to the second body end, and a second body side opposite and spaced apart from the first body side. The body defines a first channel extending along the first body side from the first body end to the second body end and a second channel extending along the second body side from the first body end to the second body end. Each of the first strap and the second strap has a first strap end and a second strap end opposite and spaced apart from the first strap end. The first strap extends through the first channel and the second strap extends through the second channel. The first strap ends of the first strap and the second strap are coupled to the first body end and the second strap ends of the first strap and the second strap are coupled to the second body end. The one or more first fasteners are coupled adjacent the first body end. The one or more second fasteners are coupled adjacent the second body end. Each of the one or more second fasteners is releasably couplable to a different one of the one or more first fasteners.

In some implementations, the tire cover further includes a first strip coupled to the first end and a second strip coupled to the second end. In some implementations, the one or more first fasteners are coupled to the first strip and the one or more second fasteners are coupled to the second strip.

In some implementations, the first strap and the second strap include an elastically deformable material. In some implementations, the body has a body length as measured along the longitudinal axis from the first body end to the second body end. In some implementations, the first strap and the second strap each have a strap length as measured from the first strap end to the second strap end in a relaxed position. In some implementations, the body length is longer than the strap length. In some implementations, the first strap and the second strap comprise an inelastic material.

In some implementations, the body has a body length as measured along the longitudinal axis from the first body end to the second body end. In some implementations, the body length is 81.5 inches or more. In some implementations, the body length is 86 inches or more. In some implementations, the body length is 91 inches or more.

In some implementations, the one or more first fasteners and the one or more second fasteners include snap buttons. In some implementations, the one or more first fasteners and the one or more second fasteners include opposing zipper portions. In some implementations, the one or more first fasteners and the one or more second fasteners include buckles. In some implementations, the one or more first fastener and the one or more second fasteners include hook and loop fasteners.

In some implementations, the one or more first fastener further includes a protrusion portion configured to extend around a tire to couple the first body end to a portion of the tire. In some implementations, the one or more first fastener further includes a loop. In some implementations, when the protrusion portion is extended around the tire, the protrusion portion is configured to extend through the loop to couple the first body end to a portion of the tire.

In some implementations, the one or more first fasteners are coupled to the first body end and the one or more second fasteners are coupled to the second body end. In some implementations, the one or more first fasteners are coupled to the first end of the first strap and the first end of the second strap and the one or more second fasteners are coupled to the second end of the first strap and the second end of the second strap. In some implementations, a length of the first strap between first fastener and the second fastener and a length of the second strap between first fastener and the second fastener are adjustable.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Various implementations include a tire cover. The tire cover includes a body, a first strap, a second strap, one or more first fasteners, and one or more second fasteners. The body has a longitudinal axis, a first body end, a second body end opposite and spaced apart along the longitudinal axis from the first body end, a first body side extending from the first body end to the second body end, and a second body side opposite and spaced apart from the first body side. The body defines a first channel extending along the first body side from the first body end to the second body end and a second channel extending along the second body side from the first body end to the second body end. Each of the first strap and the second strap has a first strap end and a second strap end opposite and spaced apart from the first strap end. The first strap extends through the first channel and the second strap extends through the second channel. The first strap ends of the first strap and the second strap are coupled to the first body end and the second strap ends of the first strap and the second strap are coupled to the second body end. The one or more first fasteners are coupled adjacent the first body end. The one or more second fasteners are coupled adjacent the second body end. Each of the one or more second fasteners is releasably couplable to a different one of the one or more first fasteners.

Figure 1:
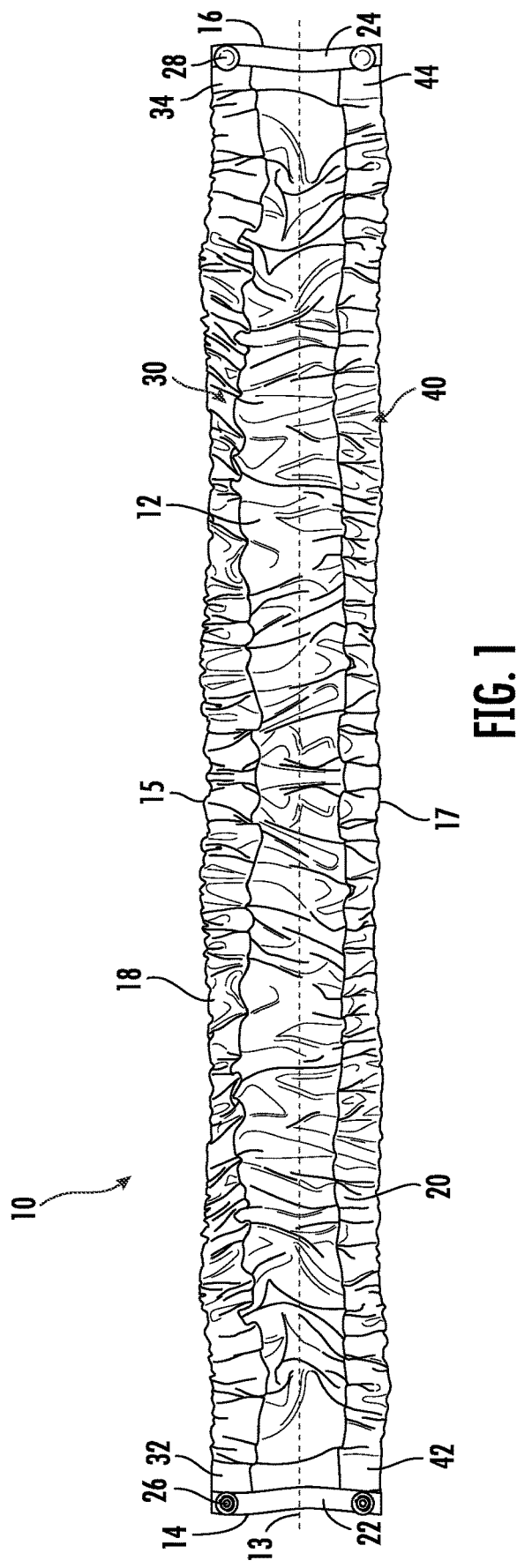
FIG. 1 shows a top plan view of a tire cover according to one embodiment of the present disclosure.

FIG. 1 shows a basic embodiment of a tire cover 10 for substantially covering a tire, such as a bicycle tire, to prevent dirt or other debris on the tire from contaminating a space. The tire cover 10 is adapted to fit a variety of sizes and diameters of tires and may be adjustable such that the tire cover 10 may be adjusted to fit various sizes of tires. The tire cover 10 is further adapted to be readily placed over a tire that is already mounted, such as a wheel and tire that are already secured to a bicycle. The tire cover 10 may be placed over the tire without requiring removal of the wheel or tire from the bicycle.

The tire cover 10 may include an elongate body 12 having a longitudinal axis 13 running extending along the length of the body 12. The body 12 has a first body end 14 and a second body end 16 that is opposite and spaced apart along the longitudinal axis 13 from the first end 14. The body 12 further includes a first body side 15 extending from the first body end 14 to the second body end 16 and a second body side 17 opposite and spaced apart from the first body side 15. The body 12 may be in the shape of an elongated rectangular or other suitable shape. The body 12 may be formed of a flexible material that may cover a wheel of a bicycle, such as a durable fabric material.

The tire cover 10 includes a first channel 18 located along the first body side 15 from the first body end 14 to the second body end 16 and a second channel 20 located along the second body side 17 from the first body end 14 to the second body end 16. The first channel 18 may be shaped to receive a first strap 30, and the second channel 20 may be shaped to receive a second strap 40. The first strap 30 has a first strap end 32 and a second strap end 34 opposite and spaced apart from the first strap end 32 of the first strap 30, and the second strap 40 has a first strap end 42 and a second strap end 44 opposite and spaced apart from the first strap end 32 of the second strap 40. The first strap ends 32, 42 of the first strap 30 and the second strap 40 are coupled to the first body end 14, and the second strap ends 34, 44 of the first strap 30 and the second strap 40 are coupled to the second body end 16.

Figure 5:
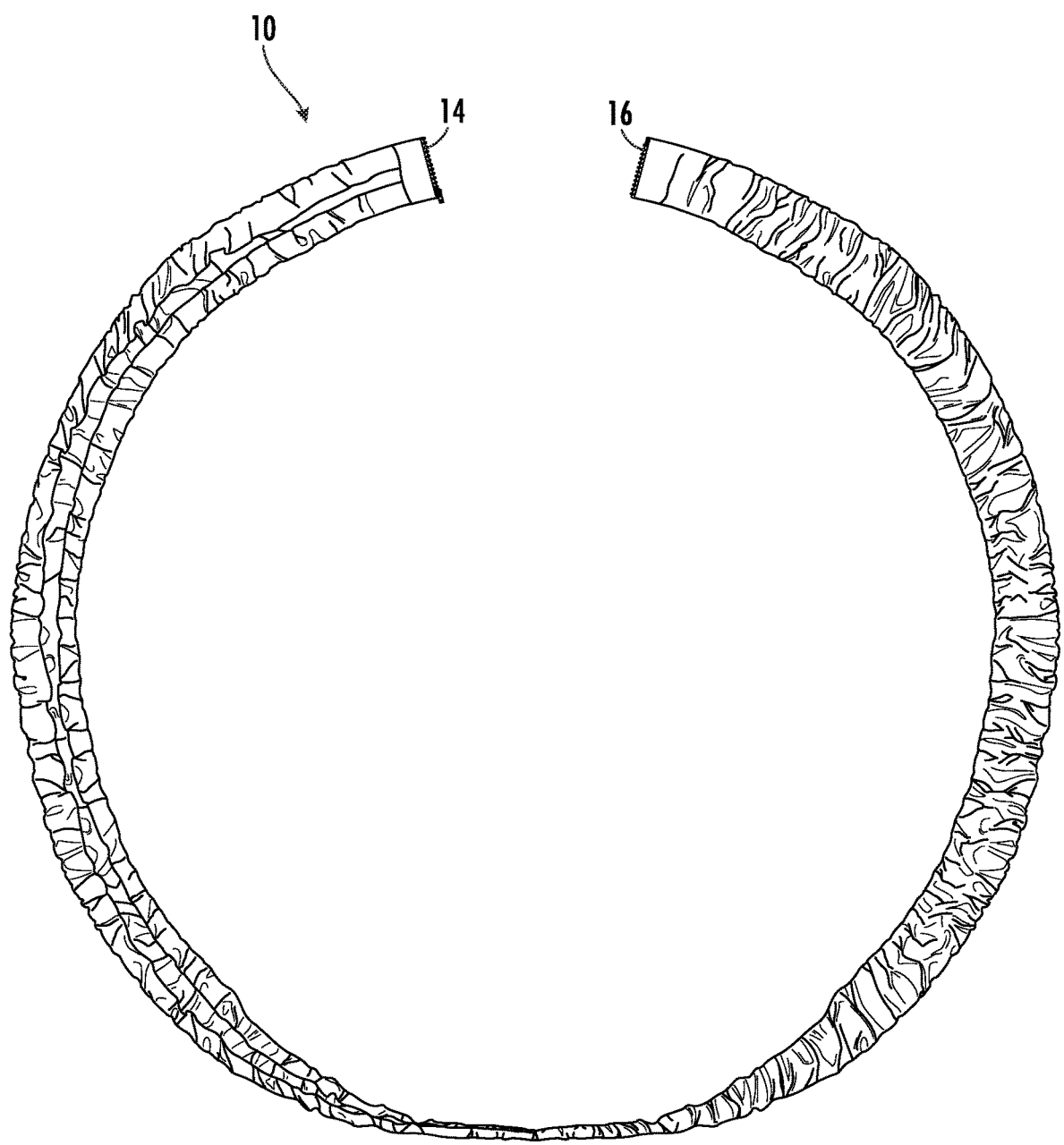
FIG. 5 shows a side view of a tire cover having a zipper fastener according to one embodiment of the present disclosure.
Figure 6:
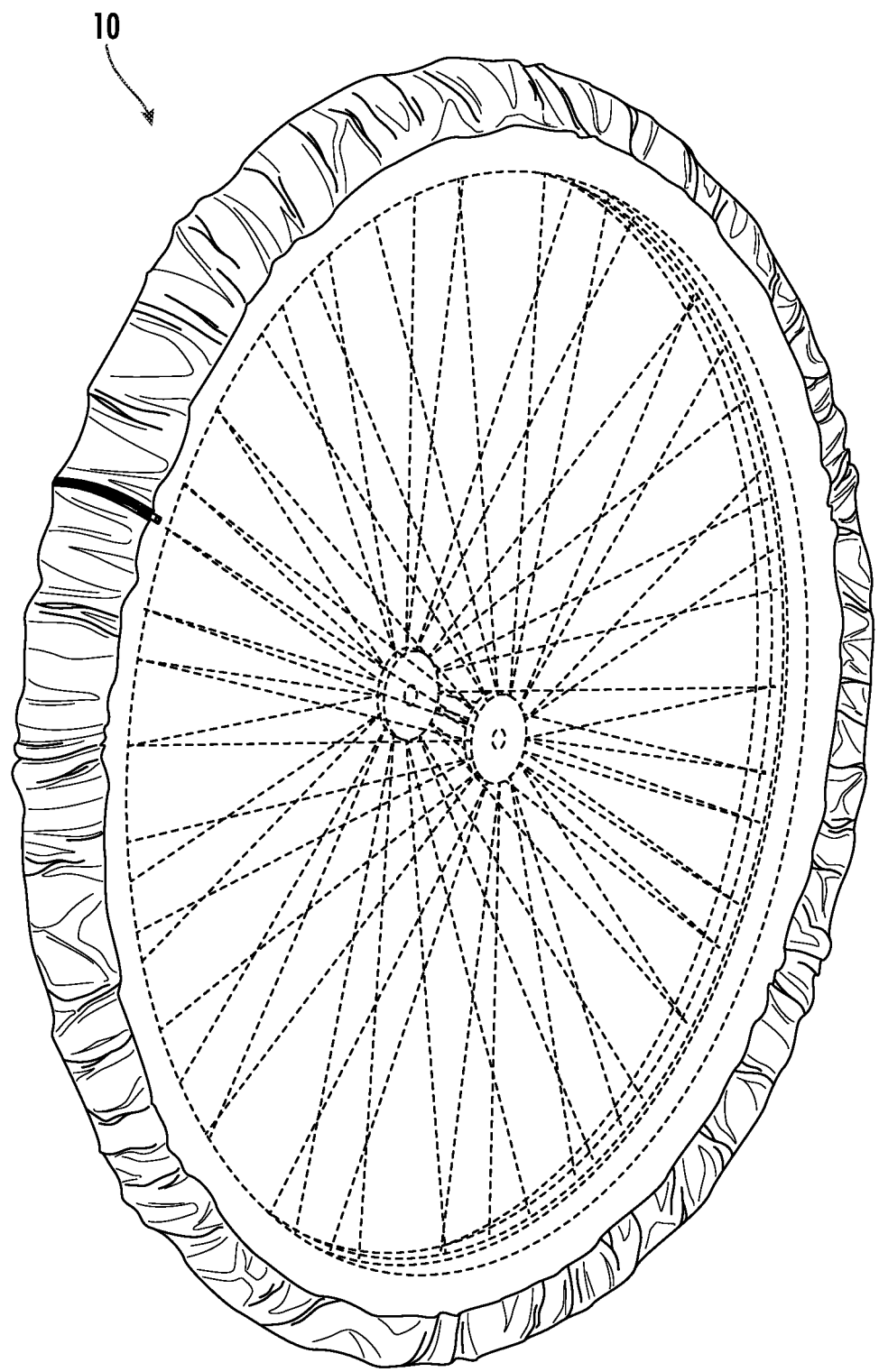
FIG. 6 shows a perspective view of a tire cover installed on a bicycle wheel according to one embodiment of the present disclosure.
Figure 7:
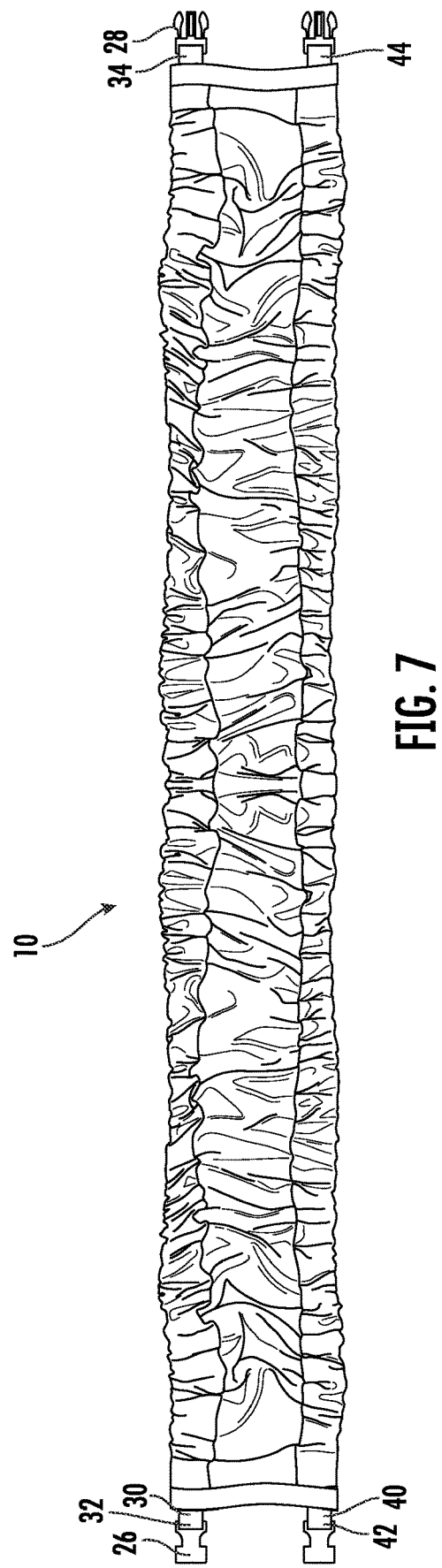
FIG. 7 shows a top plan view of a tire cover having buckles according to one embodiment of the present disclosure.
Figure 8:
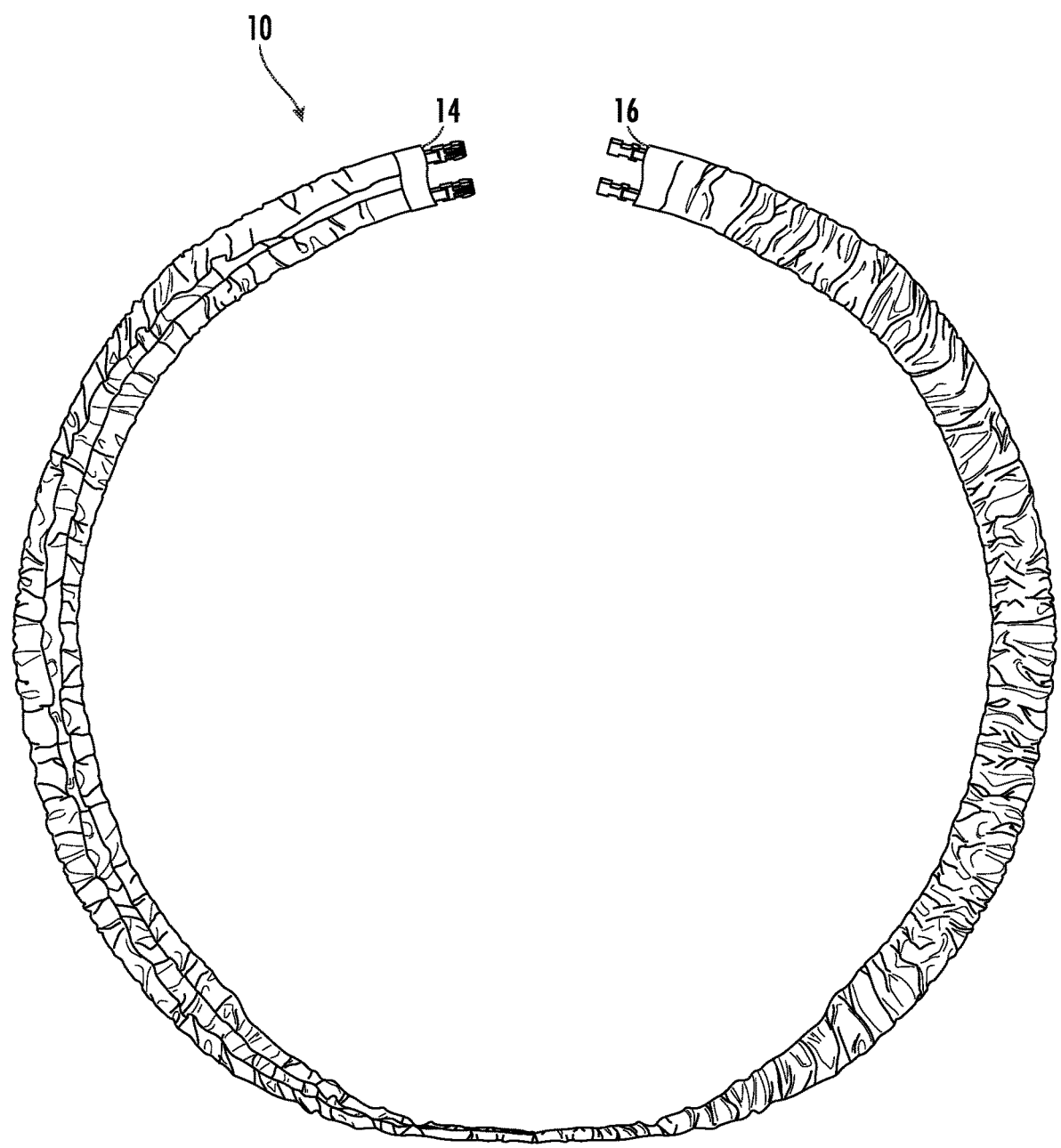
FIG. 8 shows a side view of a tire cover having buckles according to one embodiment of the present disclosure.
Figure 9:
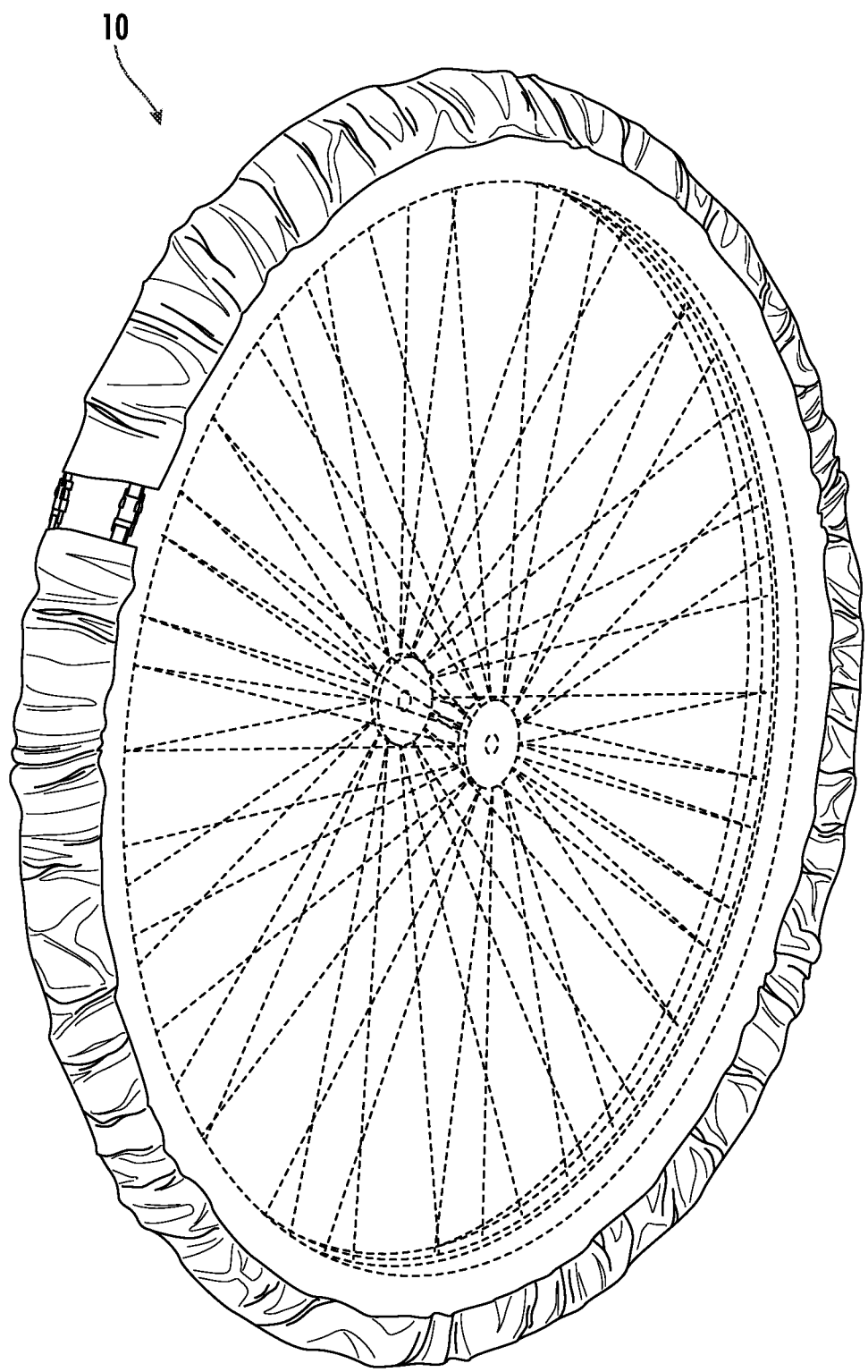
FIG. 9 shows a perspective view of a tire cover having buckles installed on a bicycle wheel according to one embodiment of the present disclosure.
Figure 10:
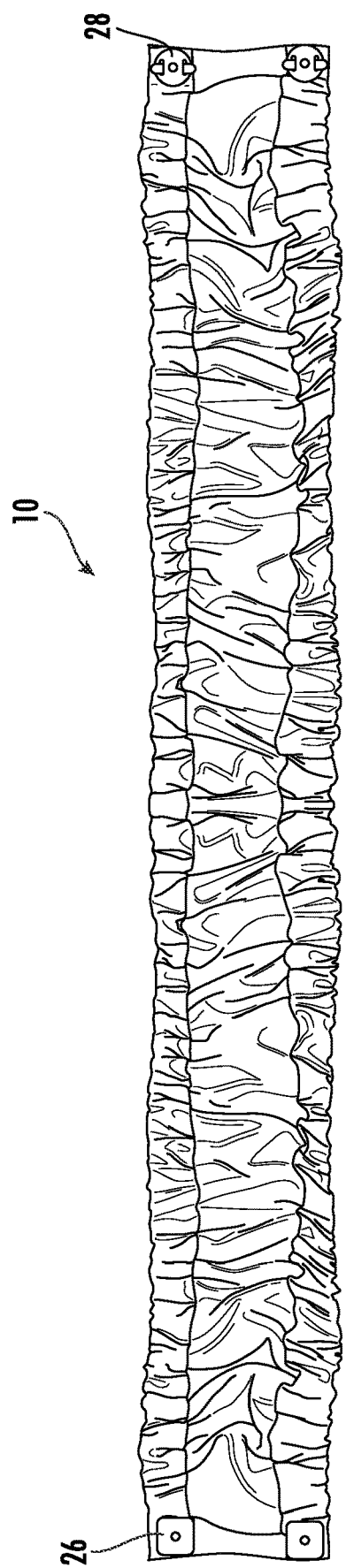
FIG. 10 shows a top plan view of a tire cover according to one embodiment of the present disclosure.
Figure 11:
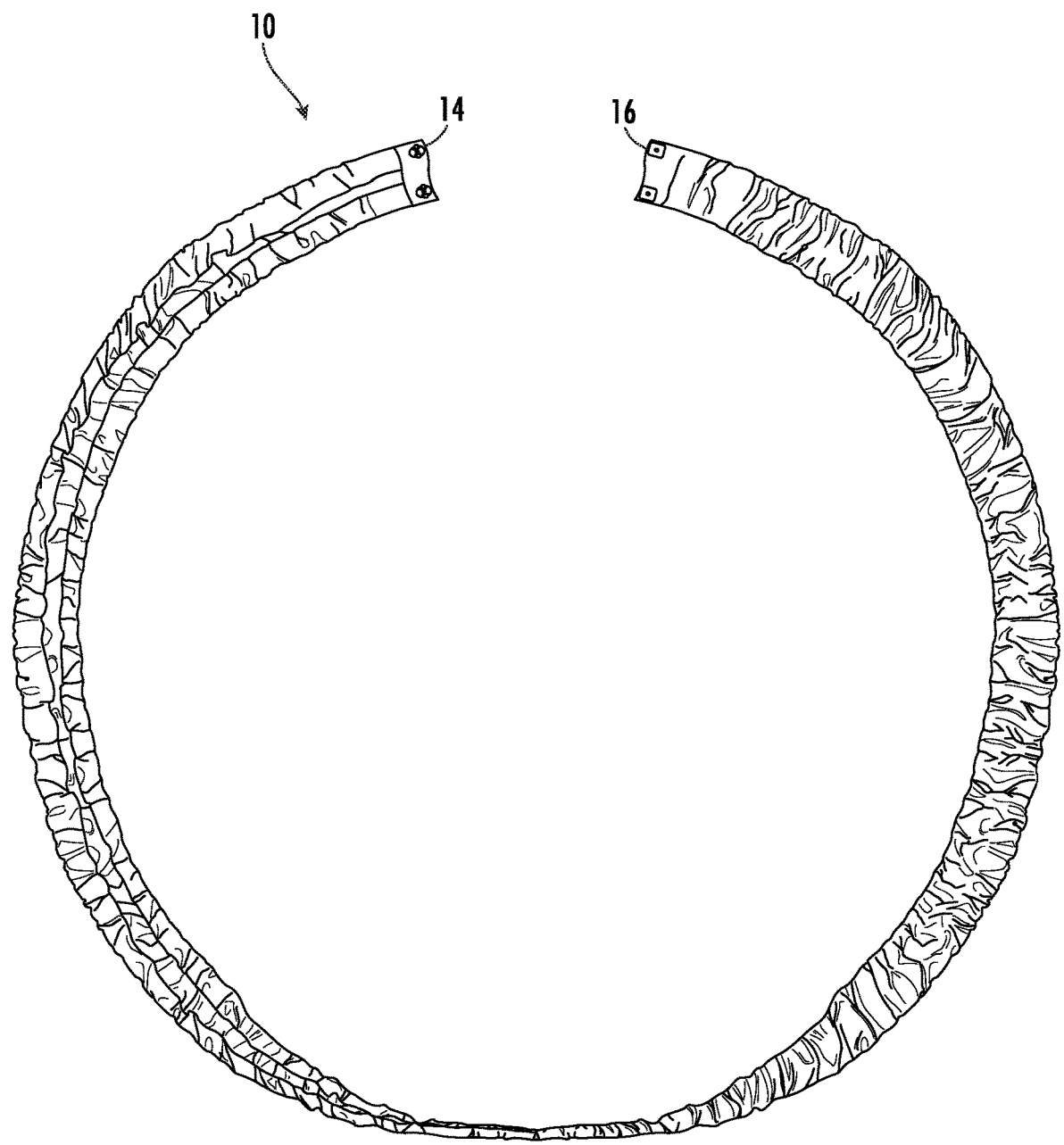
FIG. 11 shows a side view of a tire cover according to one embodiment of the present disclosure.
Figure 12:
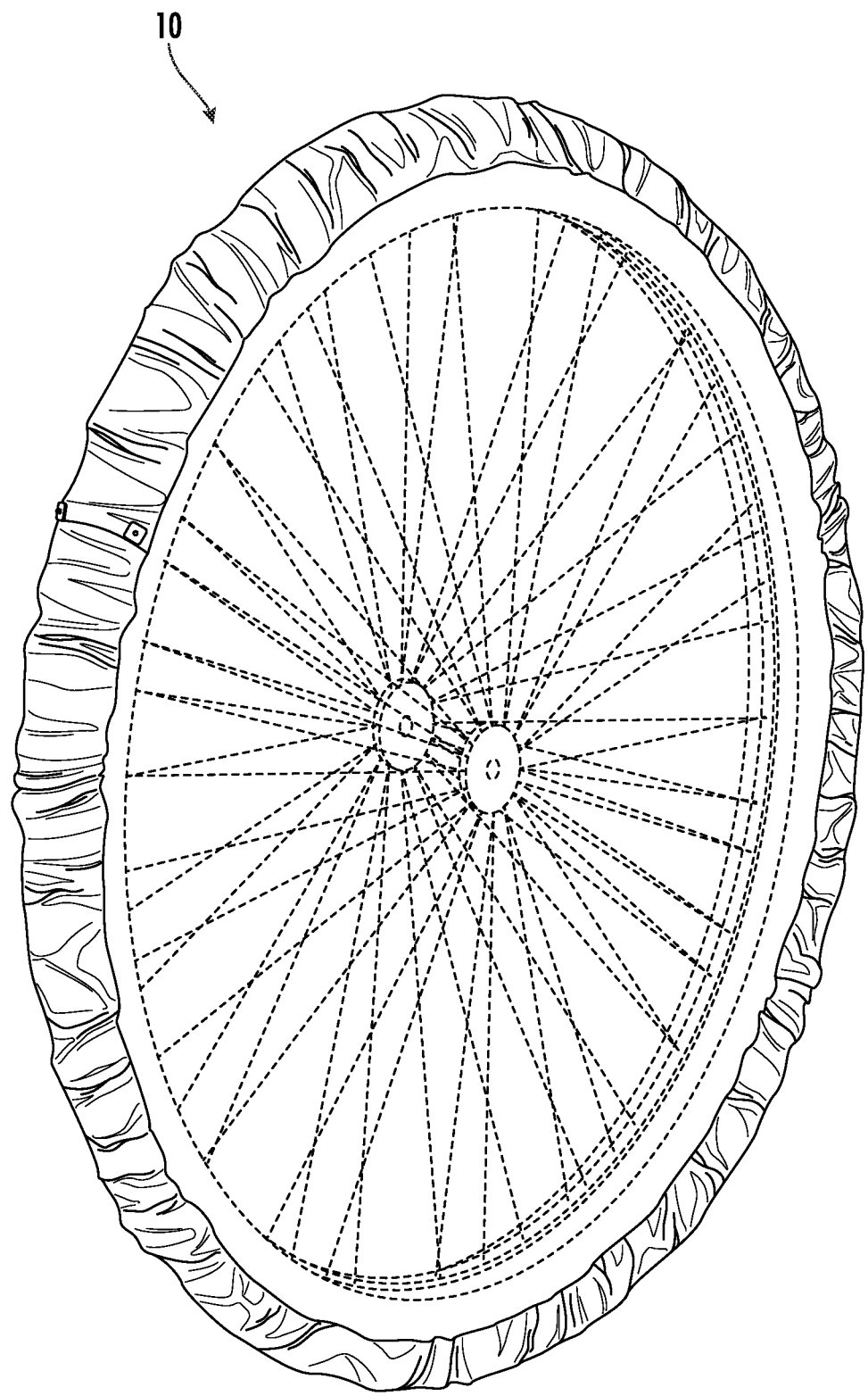
FIG. 12 shows a perspective view of a tire cover installed on a bicycle wheel according to one embodiment of the present disclosure.

The first strap 30 and the second strap 40 may be formed of an elastically deformable material or portion, as shown in FIGS. 1-6 and 10-12, or an inelastic material, as shown in FIGS. 7-9. The first channel 18 and the second channel 20 may be formed such as by stitching or sewing the first body side 15 and second body side 17, or they can be separately formed and coupled to the body 12. The first strap 30 and second strap 40 may be sewn within the first channel 18 and the second channel 20.

Figure 3:
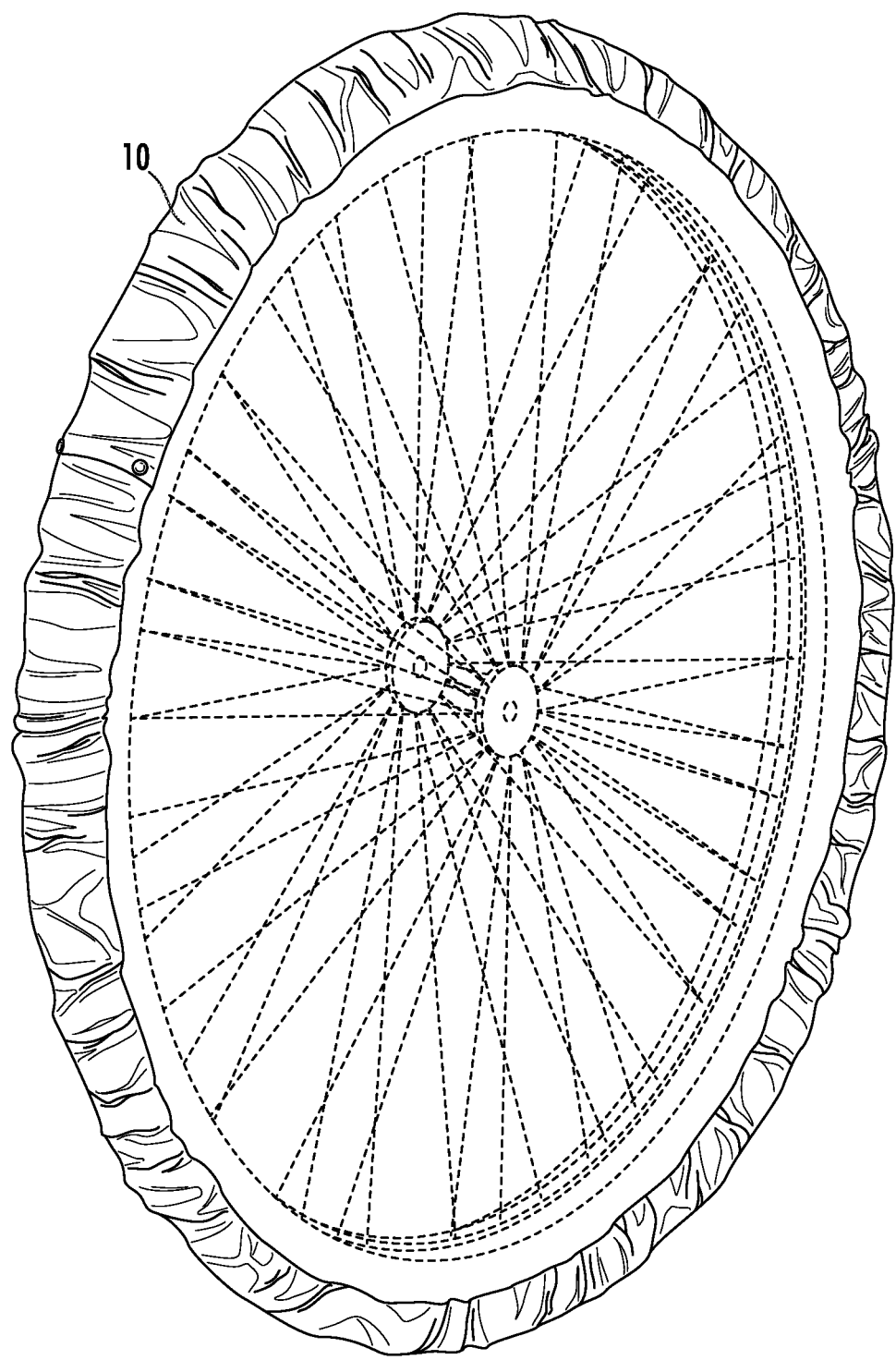
FIG. 3 shows a perspective view of a tire cover installed on a bicycle wheel according to one embodiment of the present disclosure.

The body 12 of the tire cover 10 and the first channel 18 and the second channel 20 thereon may be formed with excess material such that the tire cover 10 may be stretched. The body 12 has a body length as measured along the longitudinal axis 13 from the first body end 14 to the second body end 16. The first strap 30 and the second strap 40 each have a strap length as measured from their first strap end 32, 42 to their respective second strap end 34, 44 in a relaxed position. The body length can be longer than the strap length such that the elastically deformable first strap 30 and the second strap 40 located within the first channel 18 and the second channel 20, respectively, may bias the tire cover 10 towards a retracted position as shown in FIG. 1. The tire cover 10, which is made of excess material, along with the elastically deformable first strap 30 and second strap 40 may be pulled or stretched to a stretched position for locating the tire cover 10 around a bicycle wheel, as shown in FIG. 3 and discussed in greater detail below.

The body length of the body 12 shown in FIG. 1 is 91 inches such that the body 12 can extend around a standard 29-inch diameter bicycle tire. However, in some implementations, the body length is 91 inches or more. In some implementations, body length is 86 inches or more such that the body can extend around a standard 27.5-inch diameter bicycle tire. In some implementations, body length is 81.5 inches or more such that the body can extend around a standard 26-inch diameter bicycle tire. In some implementations, body length is any length corresponding to the circumference of a standard outer diameter bicycle tire.

The tire cover 10 further includes a first strip 22 coupled to the first body end 14 and a second strip 24 coupled to the second body end 16. The first strip 22 and the second strip 24 may be formed of a second fabric that is secured on the body 12 which is formed of a first fabric. For example, the first strip 22 and the second strip 24 may be formed of a material that is more durable than a material of the body 12. The first strip 22 and second strip 24 provide added strength to the first body end 14 and the second body end 16.

The first body end 14 of the tire cover 10 may be secured to the second body end 16 of the tire cover 10 to secure the tire cover 10 around a wheel of a bicycle such that the tire cover 10 substantially covers a tire mounted on a wheel of the bicycle. The tire cover 10 includes a first fastener portion 26 that coupled adjacent the first body end 14 and a second fastener portion 28 that is coupled adjacent the second body end 16.

The first fastener portion 26 and the second fastener portion 28 may be releasably couplable to one another to secure the tire cover 10 around a tire of a bicycle wheel, as shown in FIG. 3. The first fastener portion 26 may include one or more first fasteners, and the second fastener portion 28 may include one or more second fasteners. The first fastener portion 26 and the second fastener portion 28 may be located towards sides of the body 12 such that the first fastener portion 26 and the second fastener portion 28 are adjacent to the first channel 18 and the second channel 20.

The first fastener portion 26 and second fastener portion 28 may be coupled to the first strip 22 and the second strip 24, respectively, to securely attach the first fastener portion 26 and the second fastener portion 28 to the body 12, as shown in FIGS. 1-6 and 10-12. However, in some implementations, such as the implementation shown in FIGS. 7-9, the one or more first fasteners of the first fastener portion 26 are coupled to the first end 32 of the first strap 30 and the first end 42 of the second strap 40, and the one or more second fasteners of the second fastener portion 28 are coupled to the second end 34 of the first strap 30 and the second end 44 of the second strap 40. In some implementations, the first fastener portion 26 and second fastener portion 28 are coupled to any portion of the first body end 14 and the second body end 16, respectively.

Figure 2:
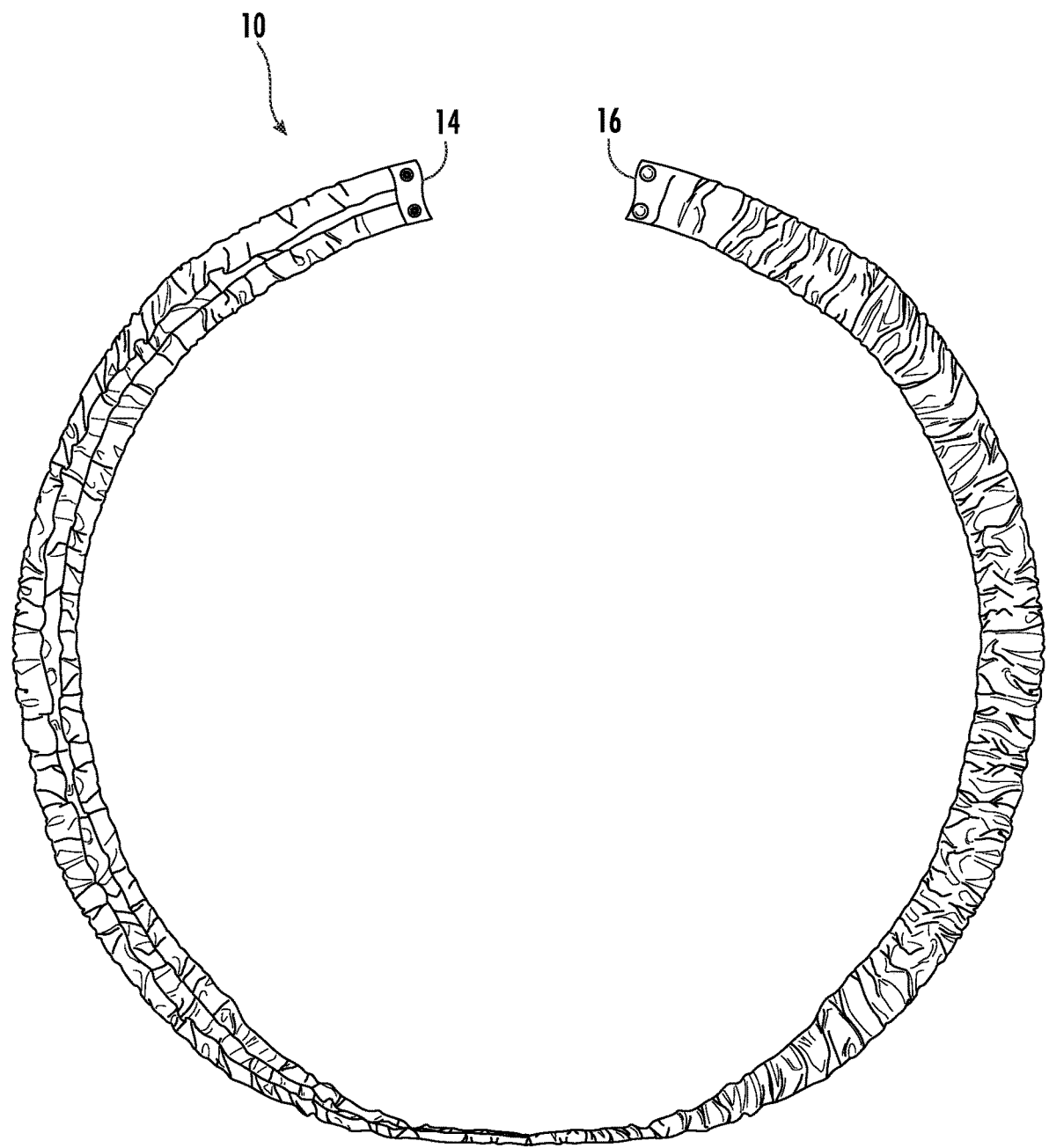
FIG. 2 shows a side view of a tire cover according to one embodiment of the present disclosure.

As shown in FIGS. 1-3, the first fastener portion 26 and the second fastener portion 28 may be formed of opposing snap buttons such that the tire cover 10 may be secured around a bicycle wheel with the snap buttons.

Figure 4:
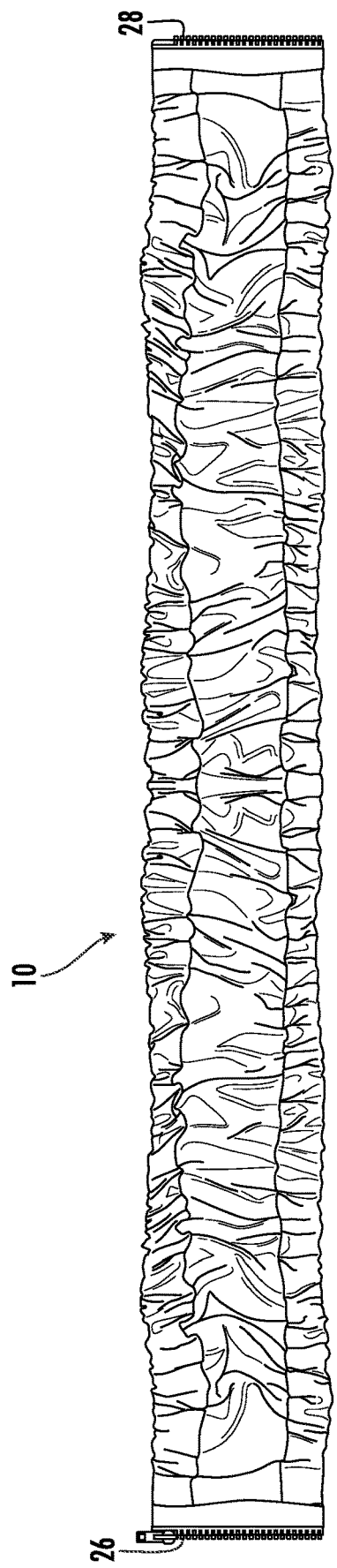
FIG. 4 shows a top plan view of a tire cover having a zipper fastener according to one embodiment of the present disclosure.

Referring to FIGS. 4-6, the first fastener portion 26 and the second fastener portion 28 may be formed of opposing zipper portions. The opposing zipper portions may be located across an entire width of the body 12. The opposing zipper portions may be secured to one another to secure the tire cover 10 around the wheel of a bicycle to substantially cover a tire of the bicycle wheel, as shown in FIG. 6. Other suitable closure or fastener mechanisms may be suitable for use in securing the tire cover 10 around a bicycle wheel, such as a closure mechanism shown in FIGS. 10-12.

The tire cover 10 may be adjustable in length such that the tire cover 10 may be suitable for use with a variety of sizes of bicycle wheels and tires, as shown in FIGS. 7-9. The tire cover 10 may include an inelastic or elastic first adjustable strap 30 extending through the first channel 18 and an inelastic or elastic second adjustable strap 32 extending from the second channel 20. The first adjustable strap 30 and the second adjustable strap 32 extent out of the first end 14 and the second end 16 of the body 12. The first adjustable strap 30 and the second adjustable strap 40 include buckles located on ends thereof as the first fastener portion 26 and the second fastener portion 28. The length of the first adjustable strap 30 and the length of the second adjustable strap 32 may be adjusted at the buckles such that the tire cover 10 may be sized for use with various bicycle wheel and tire sizes.

Figure 13:
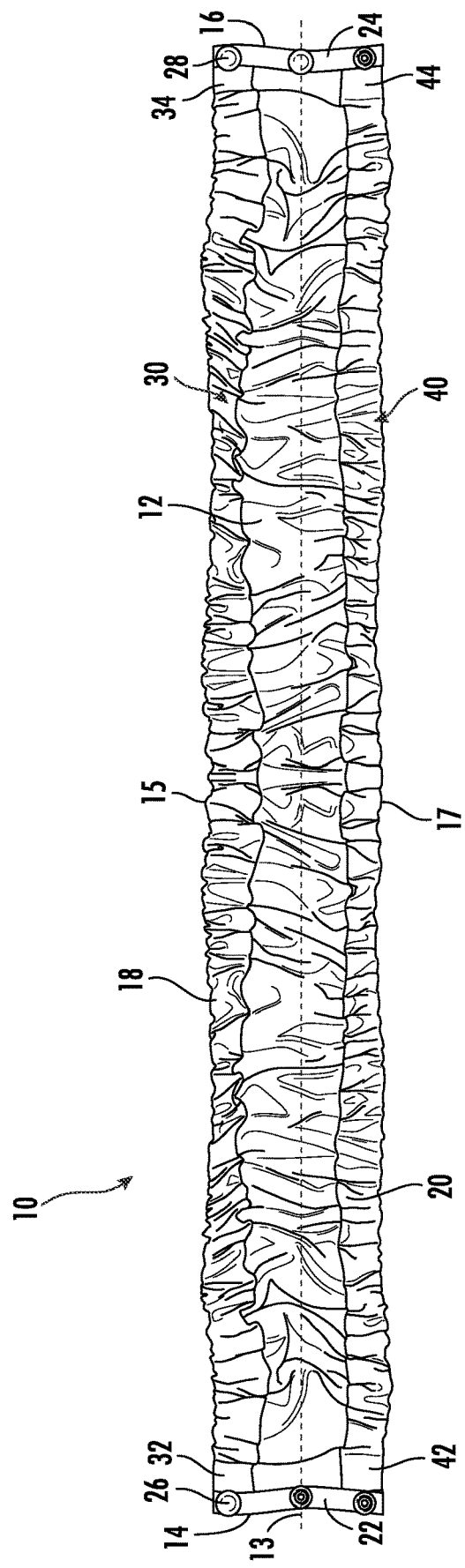
FIG. 13 shows a top plan view of a tire cover according to one embodiment of the present disclosure.
Figure 14A:
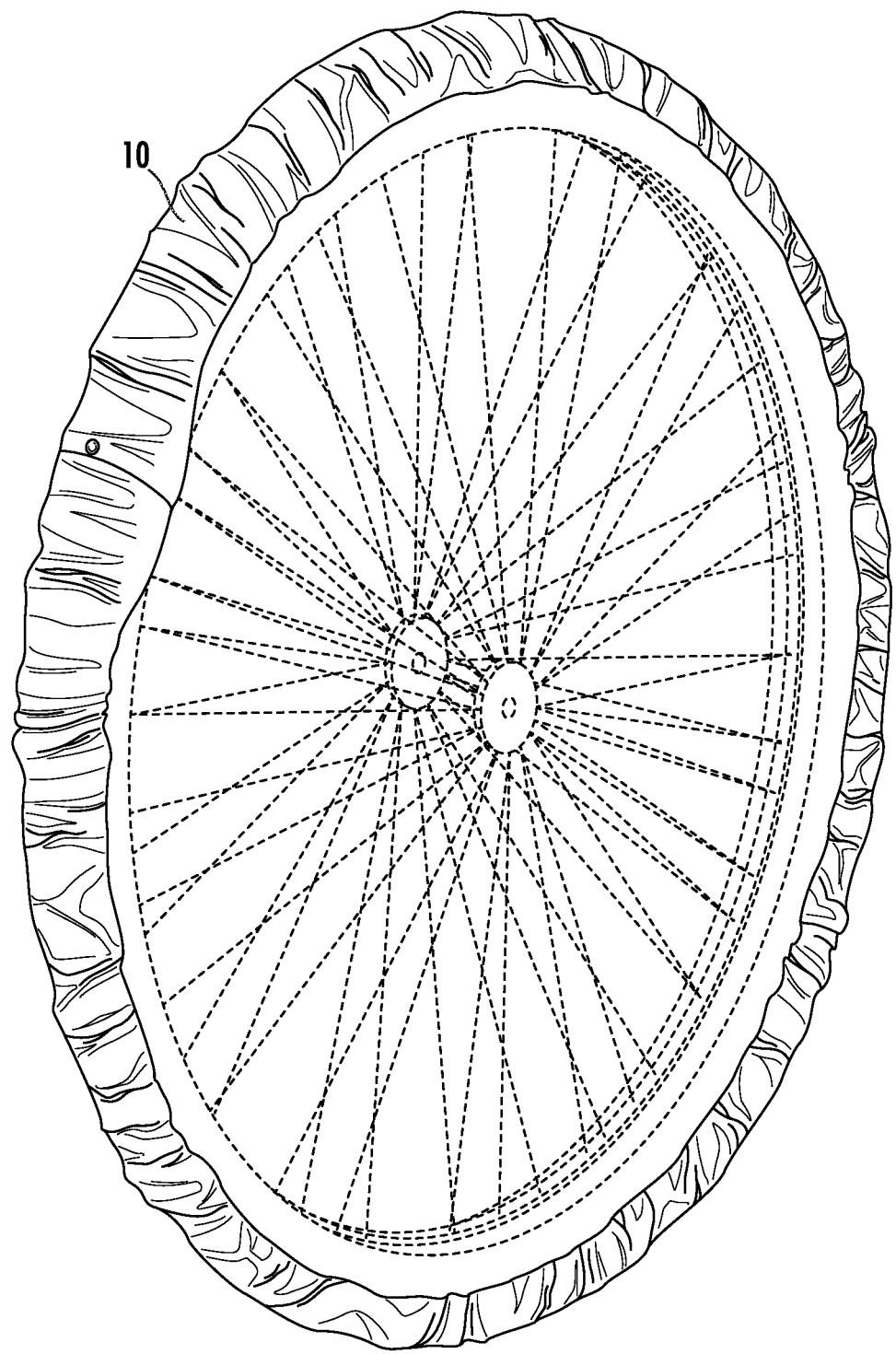
FIG. 14A shows a front perspective view of a tire cover installed on a bicycle wheel according to one embodiment of the present disclosure.
Figure 14B:
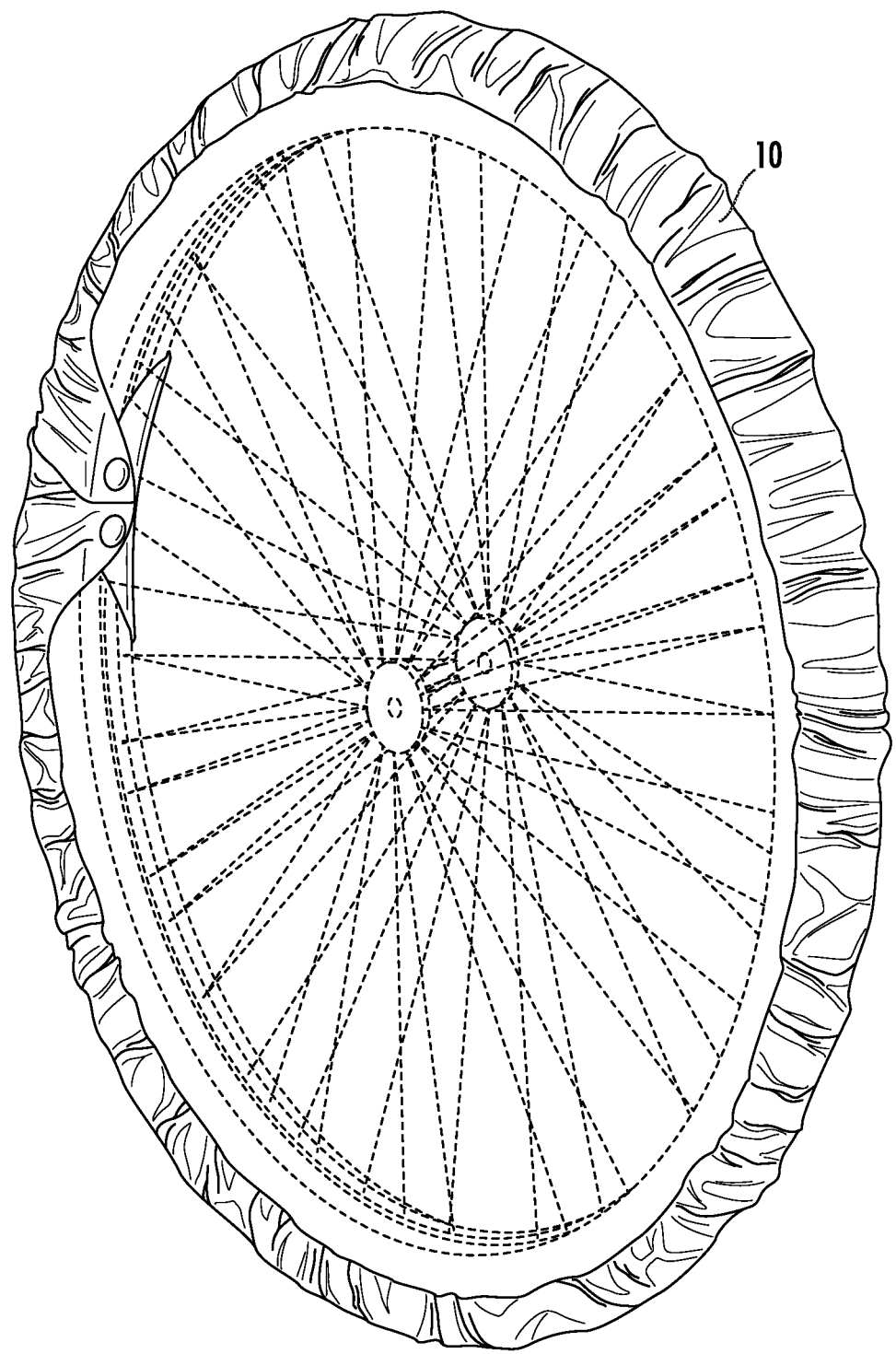
FIG. 14B shows a rear perspective view of the tire cover of FIG. 14A installed on a bicycle wheel.

Referring to FIGS. 13-14B, the first fastener portion 26 and the second fastener portion 28 may be formed of three first fasteners and three second fasteners, respectively. The three first fasteners include two first lateral fasteners and a first middle fastener, and the three second fasteners include two second lateral fasteners and a second middle fasteners. The first body end 14 is configured such that the two first lateral fasteners can be extended around the tire and wheel and coupled to each other, as shown in FIGS. 14A and 14B. The body 12 can then be extended around the circumference of the tire such that the second body end 16 is adjacent the first body end 14. The second body end 16 is configured such that the two second lateral fasteners can be extended around the tire and wheel and coupled to each other. The first middle fastener and the second middle fastener can then be coupled to each other to secure the first body end 14 to the second body end 16.

Although each of the first fastener portion 26 and the second fastener portion 28 shown in FIGS. 13-14B include two lateral fasteners and one middle fastener, in some implementations, the first fastener portion and the second fastener portion include any number of one or more lateral fasteners and any number of one or more middle fasteners.

Figure 15:
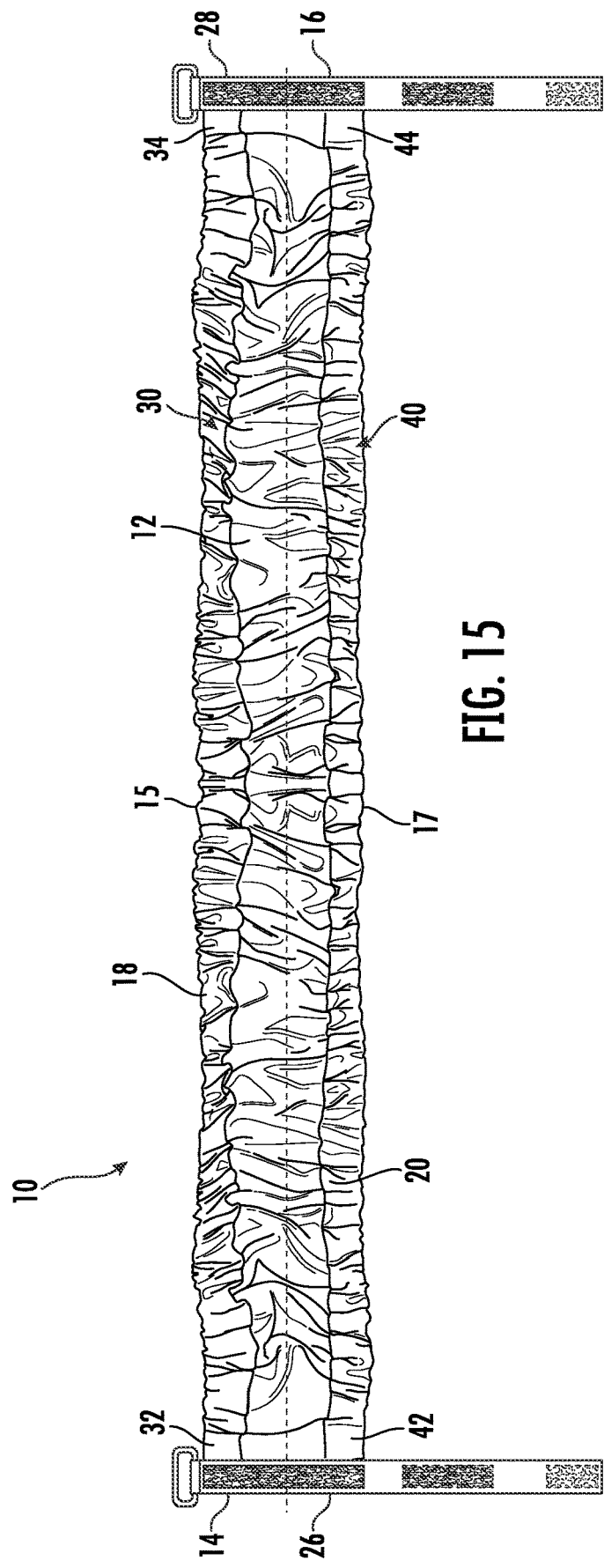
FIG. 15 shows a top plan view of a tire cover according to one embodiment of the present disclosure.
Figure 16:
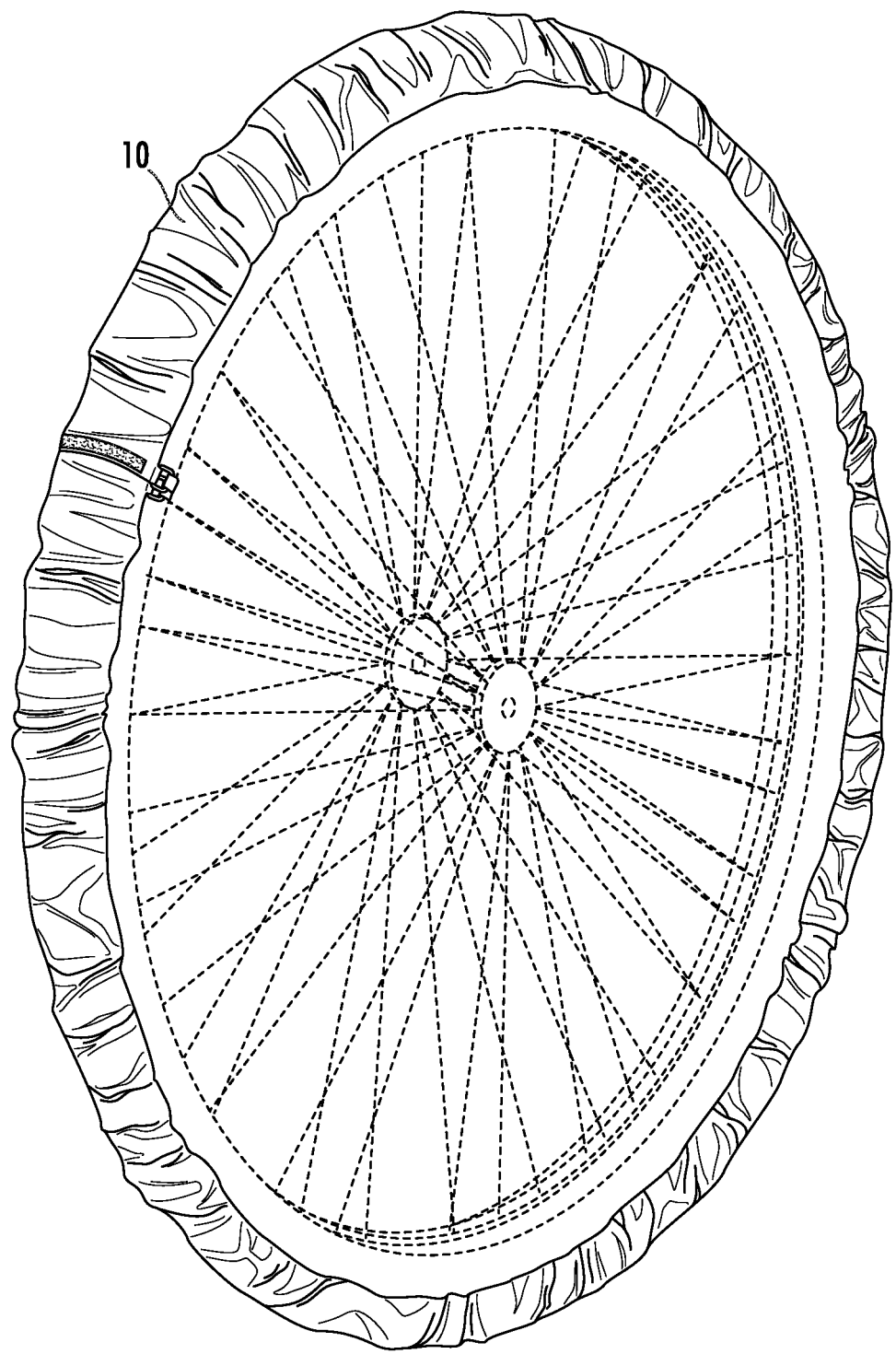
FIG. 16 shows a perspective view of a tire cover installed on a bicycle wheel according to one embodiment of the present disclosure.

Referring to FIGS. 15 and 16, the first fastener portion 26 and the second fastener portion 28 may be formed of opposing hook and loop fastener portions. The first fastener portion includes a first protrusion portion with hook and loop fasteners and a first loop, and the second fastener portion includes a second protrusion portion with hook and loop fasteners and a second loop. The first body end 14 is configured such that the first protrusion portion can be extended around the tire and wheel and extended through the first loop portion, as shown in FIG. 16. The first protrusion portion can then be doubled back on itself such that the hook and loop fasteners of the first protrusion portion couple to themselves. The body 12 can then be extended around the circumference of the tire such that the second body end 16 is adjacent the first body end 14. The second body end 14 is configured such that the second protrusion portion can be extended around the tire and wheel and extended through the second loop portion. The second protrusion portion can then be doubled back on itself such that the hook and loop fasteners of the second protrusion portion couple to themselves. The hook and loop fasteners of the first fastener portion 26 and the hook and loop fasteners of the second fastener portion 28 can then be coupled to each other to secure the first body end 14 to the second body end 16.

Although each of the first fastener portion 26 and the second fastener portion 28 shown in FIGS. 15 and 16 include a protrusion portion and a loop, in some implementations, the first fastener portion, the second fastener portion, or both does not include a protrusion portion, a loop, or both. In some implementations, the first fastener portion, the second fastener portion, or both only includes one or more hook and loop fasteners without the protrusion portion and/or loop. In some implementations, the first fastener portion, the second fastener portion, or both include the protrusion portion, the loop, or both and includes any of the other fastener types disclosed herein.

To locate the tire cover 10 around a bicycle wheel, the tire cover 10 is aligned such that the body 12 is positioned against a tire of the bicycle wheel and the first body end 14 is disposed adjacent the second body end 16. After disposing the tire cover 10 around the wheel, the first fastener portion 26 may be releasably coupled to the second fastener portion 28 to pull the tire cover 10 around the bicycle wheel and secure the tire cover in place. When the first fastener portion 26 is releasably coupled to the second fastener portion 28, the first channel 18 and the second channel 20 are pulled at least partially over opposing axially spaced sides of the tire of the bicycle wheel to prevent the tire cover 10 from becoming dislodged. Further the first channel 18 and the second channel 20 cause the tire cover 10 to have a U-shaped cross-section in a plane perpendicular to the longitudinal axis of the body 12 in use to cover side portions of the tire treads and to trap any dirt or other debris from the tire within the tire cover 10. To remove the tire cover 10, the first fastener portion 26 and the second fastener portion 20 are uncoupled from one another, thereby allowing the tire cover 10 to be removed from the wheel.

The tire cover 10 may be advantageously installed over a bicycle tire without requiring removal of a wheel of the bicycle. The tire cover 10 may be placed around the wheel to substantially cover the tire and may be pushed through the fork of the bicycle and any other portions before fastening the tire cover 10 around the bicycle tire. The tire cover 10 may prevent debris and dirt from being dropped from the tire, such as onto a floor surface when a bicycle is brought inside. The tire cover 10 may further be suitable for use with other wheeled vehicles such as motorcycles, scooters, and other wheeled vehicles.

Although the devices, systems, and methods disclosed herein are directed to tire covers for covering bicycle tires, in some implementations, the tire cover is sized and configured to be used to cover the tires or wheels of wheel chairs, motor cycles, tricycles, one-wheels, wheel barrows, and any other wheeled transportation devices.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A tire cover comprising:
   a body having a longitudinal axis, a first body end, a second body end opposite and spaced apart along the longitudinal axis from the first body end, a first body side extending from the first body end to the second body end, and a second body side opposite and spaced apart from the first body side, wherein the body defines a first channel extending along the first body side from the first body end to the second body end and a second channel extending along the second body side from the first body end to the second body end;
   a first strap and a second strap, each of the first strap and the second strap having a first strap end and a second strap end opposite and spaced apart from the first strap end, wherein the first strap extends through the first channel and the second strap extends through the second channel, wherein the first strap ends of the first strap and the second strap are coupled to the first body end and the second strap ends of the first strap and the second strap are coupled to the second body end;
   wherein the first strap and the second strap comprise an elastically deformable material;
   wherein the body has a body length as measured along the longitudinal axis from the first body end to the second body end, wherein the first strap and the second strap each have a strap length as measured from the first strap end to the second strap end in a relaxed position, wherein the body length is longer than the strap length such that the first strap and second strap bias the tire cover towards a retracted position;
   a first strip coupled to the first body end and a second strip coupled to the second body end wherein the first strip and the second strip are of a more durable material than the body;
   one or more first fasteners coupled adjacent the first body end wherein the one or more first fasteners are coupled to the first strip and the one or more second fasteners are coupled to the second strip; and
   one or more second fasteners coupled adjacent the second body end, wherein each of the one or more second fasteners is releasably couplable to one of the one or more first fasteners.

2. The tire cover of claim 1, wherein the first strap and the second strap comprise an inelastic material.

3. The tire cover of claim 1, wherein the one or more first fasteners and the one or more second fasteners comprise snap buttons.

4. The tire cover of claim 1, wherein the one or more first fasteners and the one or more second fasteners comprise opposing zipper portions.

5. The tire cover of claim 1, wherein the one or more first fasteners and the one or more second fasteners comprise buckles.

6. The tire cover of claim 1, wherein the one or more first fastener and the one or more second fasteners comprise hook and loop fasteners.

7. The tire cover of claim 1, wherein the one or more first fasteners are coupled to the first body end and the one or more second fasteners are coupled to the second body end.

8. The tire cover of claim 1, wherein the one or more first fasteners are coupled to the first end of the first strap and the first end of the second strap and the one or more second fasteners are coupled to the second end of the first strap and the second end of the second strap.

9. The tire cover of claim 8, wherein a length of the first strap and a length of the second strap are adjustable.

10. A tire cover comprising:
    a body having a longitudinal axis, a first body end, a second body end opposite and spaced apart along the longitudinal axis from the first body end, a first body side extending from the first body end to the second body end, and a second body side opposite and spaced apart from the first body side, wherein the body defines a first channel extending along the first body side from the first body end to the second body end and a second channel extending along the second body side from the first body end to the second body end;

a first strap and a second strap, each of the first strap and the second strap having a first strap end and a second strap end opposite and spaced apart from the first strap end, wherein the first strap extends through the first channel and the second strap extends through the second channel, wherein the first strap ends of the first strap and the second strap are coupled to the first body end and the second strap ends of the first strap and the second strap are coupled to the second body end;

wherein the first strap and the second strap comprise an elastically deformable material;

wherein the body has a body length as measured along the longitudinal axis from the first body end to the second body end, wherein the first strap and the second strap each have a strap length as measured from the first strap end to the second strap end in a relaxed position, wherein the body length is longer than the strap length such that the first strap and second strap bias the tire cover towards a retracted position;

one or more first fasteners coupled adjacent the first body end wherein the one or more first fasteners further comprises a protrusion portion configured to extend around a tire to couple the first body end to a portion of the tire; and one or more second fasteners coupled adjacent the second body end, wherein each of the one or more second fasteners is releasably couplable to one of the one or more first fasteners.

11. The tire cover of claim 10, wherein the one or more first fasteners further comprises a loop, wherein, when the protrusion portion is extended around the tire, the protrusion portion is configured to extend through the loop to couple the first body end to a portion of the tire.

12. A tire cover comprising:

a body having a longitudinal axis, a first body end, a second body end opposite and spaced apart along the longitudinal axis from the first body end, a first body side extending from the first body end to the second body end, and a second body side opposite and spaced apart from the first body side, wherein the body defines a first channel extending along the first body side from the first body end to the second body end and a second channel extending along the second body side from the first body end to the second body end;

a first strap and a second strap, each of the first strap and the second strap having a first strap end and a second strap end opposite and spaced apart from the first strap end, wherein the first strap extends through the first channel and the second strap extends through the second channel, wherein the first strap ends of the first strap and the second strap are coupled to the first body end and the second strap ends of the first strap and the second strap are coupled to the second body end;

wherein the first strap and the second strap comprise an elastically deformable material;

wherein the body has a body length as measured along the longitudinal axis from the first body end to the second body end, wherein the first strap and the second strap each have a strap length as measured from the first strap end to the second strap end in a relaxed position, wherein the body length is longer than the strap length such that the first strap and second strap bias the tire cover towards a retracted position;

at least two lateral first fasteners coupled adjacent the first body end and at least one first middle fastener wherein the at least two first lateral fasteners can be extended to couple each other; and at least two lateral first fasteners coupled adjacent the first body end and at least one first middle fastener wherein the at least two first lateral fasteners can be extended to couple each other, wherein each of the one or more second middle fasteners is releasably couplable to one of the one or more first middle fasteners.

\* \* \* \* \*